Aug. 13, 1946.    S. MILONE ET AL    2,405,897
RIVET
Filed March 31, 1943

Inventors:
Samuel Milone
Charles W. Rothfeld
by their Attorneys
Howson & Howson

Patented Aug. 13, 1946

2,405,897

UNITED STATES PATENT OFFICE 2,405,897

RIVET

Samuel Milone and Charles W. Rothfeld,
Philadelphia, Pa.

Application March 31, 1943, Serial No. 481,350

6 Claims. (Cl. 85—37)

This invention relates to new and useful improvements in rivets, and more particularly to rivets adapted for application from one side only of the work to be riveted together.

In the construction and assembly of structures of metal and other materials one generally employed method of attaching pieces of material is by riveting, and this is particularly true in the case of aircraft and similar structures where many of the parts are shaped and arranged so that there is not sufficient clearance or space for the use or insertion of the usual bucking bars. In such instances, it is necessary either to employ a type of rivet that may be applied from one side only of the work, or to employ a mode of assembly other than riveting.

It is known that rivets of the type which may be applied from only one side of the work are to be found in the prior art. However, such rivets for the most part consist of a plurality of separable parts and are generally objectionable in that the several parts must be assembled and also held in assembled relation while the rivet is inserted through the work to be riveted together. This requires time and care on the part of the user and generally slows down production. Furthermore, such rivets when secured in place are generally of the open or "eyelet" type and this is neither adequate nor desirable for many classes and kinds of work.

The present invention, therefore, contemplates certain improvements in rivets of the type that may be applied from one side only of the work, and the principal object of the invention is to provide a novel rivet of the type described which comprises an integral and unitary structure.

Another object of the invention is to provide a unitary rivet of the type set forth which is of substantially solid construction and therefore provides a rivet characterized by its high resistance to shear stresses.

Another object of the invention is to provide a novel rivet of the character described which, when finally set, fully closes the opening in which the rivet is secured as distinguished from a rivet of the tubular or eyelet type.

A further object is to embody the novel features of the invention in a bolt construction for securing a nut thereon against displacement.

These and other objects of the invention and the various features and details of the construction and application thereof are hereinafter fully set forth and shown in the accompanying drawing, in which.

Figure 1:
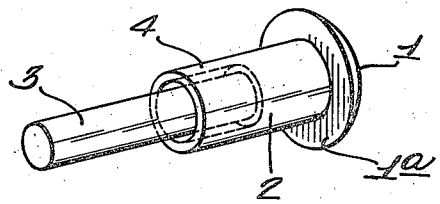
Figure 1 is a view in perspective of a rivet embodying the present invention.

Referring now more particularly to the drawing, a rivet embodying the present invention comprises essentially integral and unitary head and shank portions 1 and 2, respectively. As shown, the shank 2 is of a predetermined diameter less than that of the head 1 and includes a coaxially extending neck portion 3 of reduced diameter and a shoulder flange portion 4 disposed in radially spaced concentric relation with respect to said neck portion 3.

Figure 2:
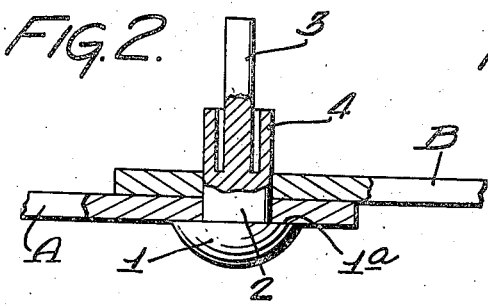
Figure 2 is a view partially in section showing the rivet inserted through aligned openings in a pair of structural plates and in position to be set.

The neck portion 3 of the shank projects outwardly beyond the spaced concentric shoulder flange 4 as shown, and the base of the said neck 3 and the base of said shoulder flange 4 reside in a common plane which lies cross-sectionally of the shank 2 in predetermined axially spaced relation with respect to the adjacent or under face 1a of the rivet head 1. In practice, and as shown in Figure 2 of the drawing, the distance or space between the under face 1a of the rivet head 1 and the plane of the bases of the neck 3 and flange 4 preferably is equal to the thickness of the two or more pieces of material that are to be secured together by the rivet. Too, the axial length and radial thickness of the shoulder flange 4 in a given rivet may vary according to the size and nature of the pieces of material to be riveted together.

Figure 3:
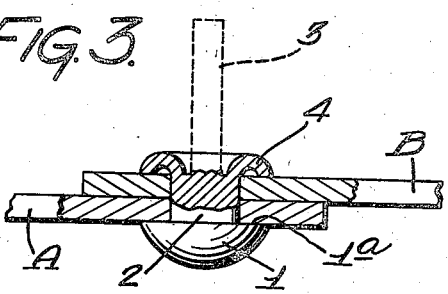
Figure 3 is a view similar to the disclosure in Figure 2 showing the rivet applied or set.

As illustrative of the manner of applying the rivet of the present invention there is shown, in Figure 2, a pair of overlying metal plates A and B suitably drilled for attachment by a rivet which is inserted through the plate holes as indicated. With the rivet positioned as shown in said Figure 2 it may then be finally "set" by grasping the neck portion 3 thereof and exerting a pull axially on the rivet in a direction away from the sheet B to seat and hold the rivet head 1 firmly against the sheet A and, at the same time, the shoulder flange 4 is spun and thereby rolled outwardly over and onto the adjacent surface of said sheet B. The projecting neck portion 3 of the rivet then may be broken away to provide a riveted joint constructed and arranged as shown in Figure 3 of the drawing.

Figure 4:
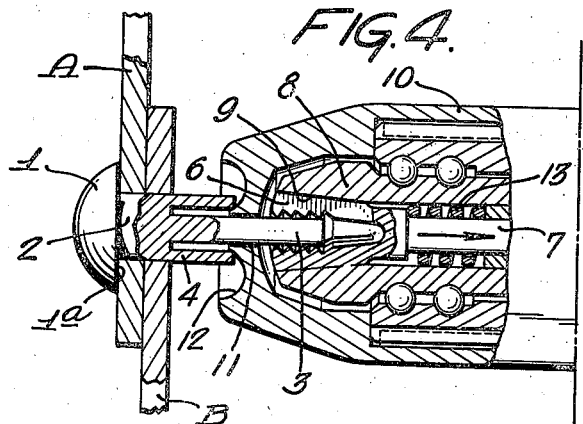
Figures 4 and 5 are diagrammatic views partially in section showing the manner or method by which the rivet may be set.
Figure 5:
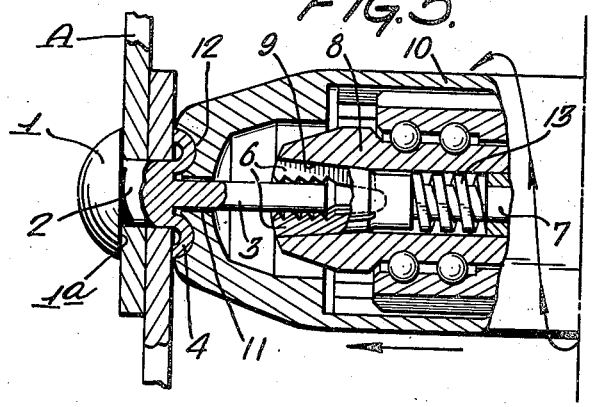

One form of device for setting the rivet is shown in Figures 4 and 5 of the drawing. This device may comprise a pair of cooperable jaws 6 carried on the outer end of a shaft 7 which is mounted for axial movement within a fixedly mounted tubular bushing 8. The interior surface of the bushing 8 at the outer end thereof is inclined or beveled as indicated at 9 and corresponding inclined surfaces are provided on the outer lateral surfaces of the jaws 6 as shown.

Mounted exteriorly of the fixed bushing 8 for both rotary and longitudinal sliding movement with respect thereto is a sleeve 10 the outer end of which is provided with an axial opening 11 and formed as indicated at 12 to provide a tool for spinning or rolling over the rivet shoulder flange 4. Normally, when the device is not in use, the shaft 7 and jaws 6 are held in their outermost position longitudinally with respect to the bushing 8, and with their end faces abutting the inner end face of the sleeve 10, by means of a spring 13. With the jaws 6 held in this position by said spring 13 they reside outwardly along the inclined surfaces 9 of the bushing a distance sufficient to permit said jaws to open to an extent to permit insertion therebetween of the neck 3 of the rivet.

When the rivet neck 3 is inserted inwardly of the end opening 11 of the sleeve 10 and between the jaws 6, as aforesaid, the shaft 7 and said jaws 6 are retracted or actuated relative to the fixed bushing 8 in the direction of the arrow (Fig. 5) against the action of the spring 13, thereby causing the surfaces 9 of the bushing to cam the jaws 6 toward each other and clamp the neck 3 of the rivet therebetween, as shown. The rivet is thus firmly held in place with its head 1 against plate or sheet A, and while the rivet neck is held in this manner by the jaws 6, the sleeve 10 is driven rotationally, and, at the same time, advanced relative to the bushing 8 toward the sheet or plate B, thereby causing the tool end 12 of said sleeve to engage and spin or roll the rivet shoulder flange 4 outwardly over and onto the adjacent surface of the sheet or plate B as shown in Figure 5 of the drawing. The sleeve 10 is then retracted and the pull on shaft 7 released, whereupon the spring 13 actuates the jaws forwardly or outwardly of the bushing causing them to release their grip upon the rivet neck 3 and the device then may be removed and the rivet neck 3 broken away to provide the riveted joint construction of Figure 3.

The invention may be employed as well in conjunction with bolts and the like where it is desired to secure a nut or like element thereon against removal or displacement. The invention, therefore, may be employed to advantage to lock a nut tightly upon a bolt or, in the case of nuts which sometimes are loosely threaded on a bolt, to prevent further loosening and removal of the nut as is sometimes accomplished at the present time by means of cotter pins, additional lock nuts, and the like.

Figure 6:
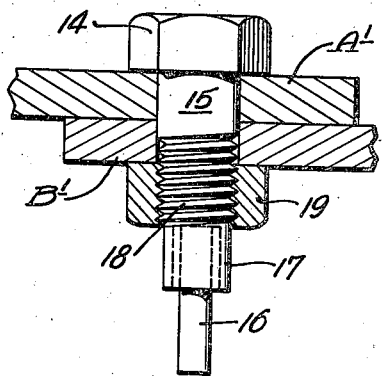
Figures 6 and 7 are views showing the present invention embodied in a novel bolt construction to provide for securing a nut thereon against displacement.

Referring to Figure 6 of the drawing, a bolt embodying the present invention may comprise a head 14 and integral shank 15, the latter including a coaxially extending neck portion 16 and a radially spaced concentric shoulder flange 17. As shown, the base of the flange 17 and the base of the neck 16 reside in a common plane which lies cross-sectionally of the shank in axially spaced relation with respect to the adjacent or under face of the head 14.

The exterior surface of the shank 15 which resides between the head 14 and the plane of the bases of the neck 16 and flange 17 is threaded as indicated at 18 to receive thereon a nut 19, it being understood that the said threaded shank portion has an axial length sufficient to extend entirely through the pieces of material A' and B' to be secured together and, in addition, to project beyond them a distance sufficient to receive a nut 19 thereon as shown in the drawing.

Figure 7:
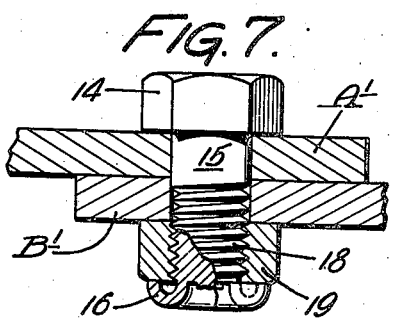

When the nut 19 has been threaded and tightened on the shank 15 to the desired extent, the shoulder flange 17 may then be spun or rolled outwardly and over onto the adjacent nut surface as shown in Figure 7, thereby preventing removal or loosening of the nut 19. The shoulder flange 17 may be spun or rolled over in the manner and by a device such as that previously described in connection with the rivet form of the invention.

From the foregoing it will be seen that the present invention provides a novel rivet that may be applied from one side only of the work and which is of unitary solid construction providing high resistance to shear stresses. The invention also provides a bolt construction having a novel construction and arrangement for securing a nut thereon against removal, displacement and loosening.

While particular embodiments of the invention have been herein illustrated and described, it is not intended that the invention be limited to such disclosures but that changes and modifications may be made and embodied therein within the scope of the claims.

We claim:

1. A preformed unitary headed fastening element comprising a shank of predetermined diameter less than said head and including a coaxially extending neck portion of reduced diameter and a radially spaced concentric straight cylindrical shoulder flange portion, the base of the flange portion and the base of the neck portion being in a common plane cross-sectionally of said shank in axially spaced relation to said head.

2. A preformed unitary headed fastening element comprising a shank of predetermined diameter less than said head and including a coaxially extending neck portion of reduced diameter and a radially spaced concentric straight cylindrical shoulder flange portion, said neck portion extending axially outward beyond said shoulder flange portion and the base of the flange portion and the base of the neck portion being in a common plane cross-sectionally of said shank in axially spaced relation to said head.

3. A preformed unitary rivet comprising a head and an integral shank portion of predetermined diameter less than said head, said shank including a coaxially extending neck portion of reduced diameter and a straight cylindrical shoulder flange portion radially spaced concentrically of said neck portion, the base of the neck portion and the base of the shoulder flange portion being in a common plane cross-sectionally of the shank in axially spaced relation to the rivet head.

4. A preformed unitary rivet comprising a head and an integral shank portion of predetermined diameter less than said head, said shank including a coaxially extending neck portion of reduced diameter and a straight cylindrical shoulder flange portion radially spaced concentrically of said neck portion, said neck portion extending axially outward beyond said shoulder flange portion and the base of the neck portion and the base of the shoulder flange portion being in a common plane cross-sectionally of the shank in axially spaced relation to the head.

5. A preformed unitary bolt comprising a head and an integral shank portion of predetermined diameter less than said head, said shank including a coaxially extending neck portion of reduced diameter and a straight cylindrical shoulder flange portion radially spaced concentrically of said neck portion, the base of the neck portion and the base of the shoulder flange portion being in a common plane cross-sectionally of the shank in axially spaced relation to the bolt head, and threads on the exterior of said shank for at least a portion of the axial length thereof between the bolt head and the common plane of the bases of the shoulder flange and neck portions thereof.

6. A preformed unitary bolt comprising a head and an integral shank portion of predetermined diameter less than said head, said shank including a coaxially extending neck portion of reduced diameter and a straight cylindrical shoulder flange portion radially spaced concentrically of said neck portion, said neck portion extending axially outward beyond said shoulder flange portion and the base of the neck portion and the base of the shoulder flange portion being in a common plane cross-sectionally of the shank in axially spaced relation to the bolt head, and threads on the exterior of said shank for at least a portion of the axial length thereof between the bolt head and the common plane of the bases of the shoulder flange and neck portions thereof.

SAMUEL MILONE.
CHARLES W. ROTHFELD.